US010217299B2

(12) United States Patent
Nakai

(10) Patent No.: US 10,217,299 B2
(45) Date of Patent: Feb. 26, 2019

(54) VEHICULAR INFORMATION COMMUNICATION SYSTEM AND VEHICULAR INFORMATION COMMUNICATION METHOD

(71) Applicant: Mitsubishi Electric Corporation, Tokyo (JP)

(72) Inventor: Yoshihiro Nakai, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/569,125

(22) PCT Filed: Jul. 31, 2015

(86) PCT No.: PCT/JP2015/071837
§ 371 (c)(1),
(2) Date: Oct. 25, 2017

(87) PCT Pub. No.: WO2017/022022
PCT Pub. Date: Feb. 9, 2017

(65) Prior Publication Data
US 2018/0102003 A1 Apr. 12, 2018

(51) Int. Cl.
*B60Q 1/00* (2006.01)
*G07C 7/00* (2006.01)
(Continued)

(52) U.S. Cl.
CPC .............. *G07C 7/00* (2013.01); *B60Q 9/00* (2013.01); *G05D 1/0022* (2013.01);
(Continued)

(58) Field of Classification Search
CPC .......... G07C 7/00; B06Q 9/00; G05D 1/0022; G05D 1/0055; H04L 41/0681
(Continued)

(56) References Cited

U.S. PATENT DOCUMENTS 7,111,147 B1 * 9/2006 Strange ................. G06F 3/0607
711/114
2002/0019877 A1 2/2002 Wrede
(Continued)

FOREIGN PATENT DOCUMENTS

DE         100 38 096 A1    2/2002
DE    10 2008 025 498 A1   12/2009
(Continued)

OTHER PUBLICATIONS

Office Action dated Oct. 12, 2018 in corresponding German Application No. 11 2015 006 757.4.

*Primary Examiner* — Zhen Y Wu
(74) *Attorney, Agent, or Firm* — Birch, Stewart, Kolasch & Birch, LLP

(57) ABSTRACT

A server divides a plurality of vehicles into groups, transmits control information to an on-vehicle information device of individual vehicles belonging to a group to which a processing turn of the transmission process has come, and receives responses indicating presence or absence of abnormality due to update of on-vehicle devices using the control information from the on-vehicle information device of each vehicle. The server performs the transmission process of the control information toward a group having a following turn when responses indicating presence of abnormality are a predetermined reference value or less, and, suspends transmission processes of control information toward groups having following and subsequent turns when the responses indicating presence of abnormality are more than the predetermined reference value.

7 Claims, 9 Drawing Sheets

(51) Int. Cl.
*B60Q 9/00* (2006.01)
*G05D 1/00* (2006.01)
*G06F 8/65* (2018.01)
*G07C 5/08* (2006.01)
*H04L 12/24* (2006.01)

(52) U.S. Cl.
CPC ............. *G05D 1/0055* (2013.01); *G06F 8/65* (2013.01); *G07C 5/0808* (2013.01); *H04L 41/0681* (2013.01)

(58) Field of Classification Search
USPC ......................................................... 340/459
See application file for complete search history.

(56) References Cited

U.S. PATENT DOCUMENTS

| | | | |
|---|---|---|---|
| 2005/0256614 A1* | 11/2005 | Habermas | G06F 8/65 701/1 |
| 2006/0018479 A1* | 1/2006 | Chen | B60R 25/00 380/270 |
| 2009/0172687 A1* | 7/2009 | Bobak | G06Q 10/06 718/104 |
| 2010/0158514 A1* | 6/2010 | Azumi | H04J 3/14 398/17 |
| 2014/0012435 A1* | 1/2014 | Sugihara | B60W 50/0098 701/2 |
| 2014/0222818 A1* | 8/2014 | Kikuchi | G06F 11/3006 707/737 |
| 2015/0113520 A1 | 4/2015 | Kotani et al. | |
| 2015/0178067 A1* | 6/2015 | Ji | G01C 21/36 717/170 |
| 2015/0370826 A1* | 12/2015 | Mraz | G06F 17/30174 707/617 |

FOREIGN PATENT DOCUMENTS

| | | |
|---|---|---|
| DE | 10 2008 056 745 A1 | 5/2010 |
| JP | 2007-38904 A | 2/2007 |
| JP | 2015-079440 A | 4/2015 |
| WO | WO 2012/132401 A1 | 10/2012 |

\* cited by examiner

| Seriousness | Outline | Examples | Upper Limit |
|---|---|---|---|
| High | Important Control Information | Control information for EPS, ABS, EBD, etc. | 1 |
| Low | Unimportant Control Information | Control information for Navigation Device, etc. | 10 |

VEHICULAR INFORMATION COMMUNICATION SYSTEM AND VEHICULAR INFORMATION COMMUNICATION METHOD

TECHNICAL FIELD

The present invention relates to a vehicular information communication system and a vehicular information communication method for communication between a server and an on-vehicle information device.

BACKGROUND ART

Patent Literature 1 discloses a vehicle controller to perform communication between an on-vehicle device installed in a vehicle and an external device over a communication network. The external device is able to set control information of the on-vehicle device by remotely operating the vehicle controller over the communication network. In the case where abnormality in behavior of the vehicle due to abnormality of the on-vehicle device occurs during operation of the on-vehicle device with the control information set by the remote operation, the vehicle controller returns the control information to a default value in order to set the on-vehicle device operating in normal.

CITATION LIST

Patent Literature 1: WO 2012/132401 A

SUMMARY OF INVENTION

It is hard for the method disclosed in Patent Literature 1 to prevent in advance a situation where the same control information as that caused abnormality in the on-vehicle device is set again in the on-vehicle device through remote operation. Furthermore, similar abnormality may occur when the control information that caused the abnormality in the on-vehicle device is set in other vehicles on which remote operation are performed through the external device. Also in this case, such a situation cannot be prevented in advance.

Thus, there has been a problem that abnormality in an on-vehicle device caused by update of control information cannot be prevented from spreading. Furthermore, it is unclear that, the abnormality is peculiar to an on-vehicle device installed in a vehicle or may occur in on-vehicle devices installed in other vehicles. Therefore, there has also been a problem that it is hard to distinguish between a potential abnormality caused in common among vehicles due to update of control information and an abnormality peculiar to a vehicle.

The present invention has been made to solve such problems as described above. Objects of the present invention are to prevent abnormality in an on-vehicle device caused by update of control information from spreading, and to be capable of distinguishing between a potential abnormality caused in common among vehicles due to update of control information and an abnormality peculiar to a vehicle.

A vehicular information communication system according to the present invention is structured to perform communication between on-vehicle information devices of vehicles and a server, one of the on-vehicle information devices being installed in one of the vehicles, wherein the on-vehicle information device is configured to receive control information from the server and update control information of an on-vehicle device, and transmit a response to the server based on the updated control information, the response indicating presence or absence of abnormality in a condition where the on-vehicle device operates, wherein, when dividing the vehicles into groups and performing a transmission process of control information in turn toward each group, the server is configured to transmit the control information to the on-vehicle information device of each vehicle belonging to a group to which a processing turn of the transmission process has come, receive responses indicating presence or absence of abnormality, when responses indicating presence of abnormality are a predetermined reference value or less, perform a transmission process of control information toward a group having a following turn, and when the responses indicating presence of abnormality are more than the predetermined reference value, suspend transmission processes of control information toward groups having following and subsequent turns.

According to the present invention, when the responses, which indicate presence of abnormality received from on-vehicle information devices of the vehicles belonging to a group to which control information has been transmitted, are more than the predetermined reference value, transmission processes of control information toward groups having following and subsequent turns are suspended. Therefore, it is capable of preventing the abnormality caused by update of the control information from spreading. Furthermore, the responses indicating the presence or absence of abnormality are assembled in the server. Therefore, it is capable of distinguishing between a potential abnormality caused in common among vehicles clue to update of control information and an abnormality peculiar to a vehicle by grasping at the server the number of on-vehicle devices in which abnormality is present and the number of on-vehicle devices in which abnormality is absent.

DESCRIPTION OF EMBODIMENTS

Embodiments for carrying out the invention will be described with reference to the accompanying drawings for more detailed explanation of the invention.G15
(Embodiment 1)

Figure 1A:
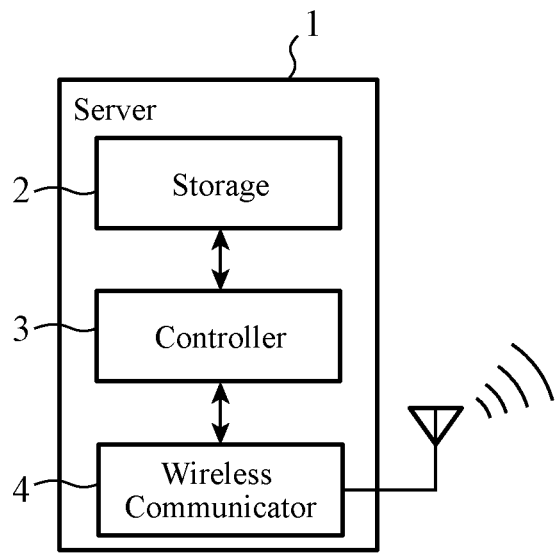
FIG. 1 is a block diagram illustrating a structural example of a server in a vehicular information communication system according to Embodiment 1 of the present invention.
Figure 1B:
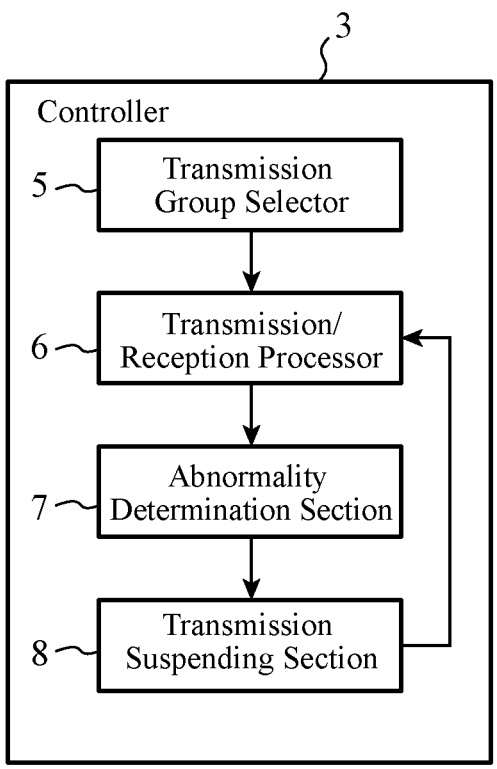
Figure 2:
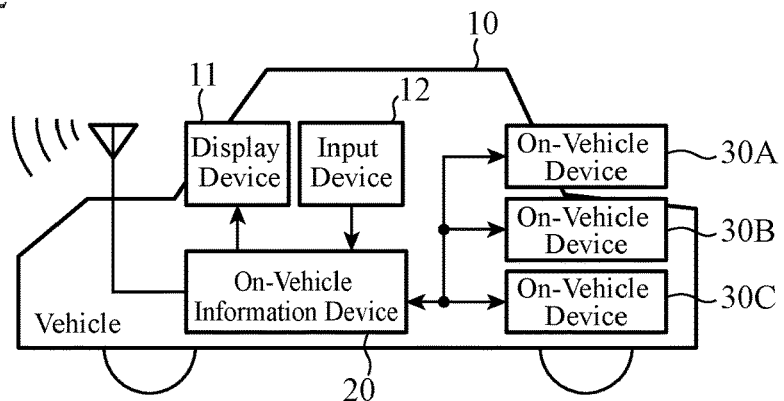
FIG. 2 is a block diagram illustrating a structural example of a vehicle in the vehicular information communication system according to the Embodiment 1.

FIG. 1A is a block diagram illustrating a structural example of a server 1 in a vehicular information communication system according to Embodiment 1 of the present invention. FIG. 1B is a block diagram illustrating an example internal structure of a controller 3 of the server 1. FIG. 2 is a block diagram illustrating a structural example of a vehicle 10 in the vehicular information communication system. The vehicular information communication system is configured to perform communication between the server 1 and on-vehicle information devices 20 installed in a plurality of vehicles 10, and update control information of the on-vehicle devices 30A to 30C installed in the vehicles 10 by remote operation of the server 1.

The server 1 illustrated in FIG. 1 includes a storage 2 to store control information of the on-vehicle devices 30A to 30C to be transmitted to the vehicles 10, a controller 3 to perform processes of transmitting/receiving the control information, or the like, and a wireless communicator 4 to perform communication with the vehicles 10.

The controller 3 includes a transmission group selector 5, a transmission/reception processor 6, an abnormality determination section 7, and a transmission suspending section 8. The transmission group selector 5 divides the vehicles 10 into groups and selects a group to which control information is to be transmitted. The transmission/reception processor 6 transmits the control information to the on-vehicle information devices 20 of the vehicles 10 belonging to a group to which a processing turn of the transmission process has come, and receives a response indicating the presence or absence of abnormality. The abnormality determination section 7 determines whether or not a response indicating the presence of abnormality is equal to or less than a predetermined reference value. The transmission suspending section 8 instructs the transmission/reception processor 6 to suspend the transmission process of control information toward the groups having following and subsequent turns when a response indicating the presence of abnormality is larger than the predetermined reference value.

In the vehicle 10 illustrated in FIG. 2, a display device 11, an input device 12, the on-vehicle information device 20, and one or more on-vehicle devices 30A to 30C are connected to an in-vehicle network such as a controller area network (CAN). In the description below, the on-vehicle devices 30A to 30C will be referred to as on-vehicle devices 30 when the individual on-vehicle devices 30 need not be distinguished from one another.

The display device 11 is capable of displaying information under the control of the on-vehicle information device 20, and may be implemented by a liquid crystal display or the like. The input device 12 receives inputs of operation performed by a user, and may be implemented by an operation device such as a remote controller, a touch sensor, a switch, a speech recognition device, or the like.

Figure 3:
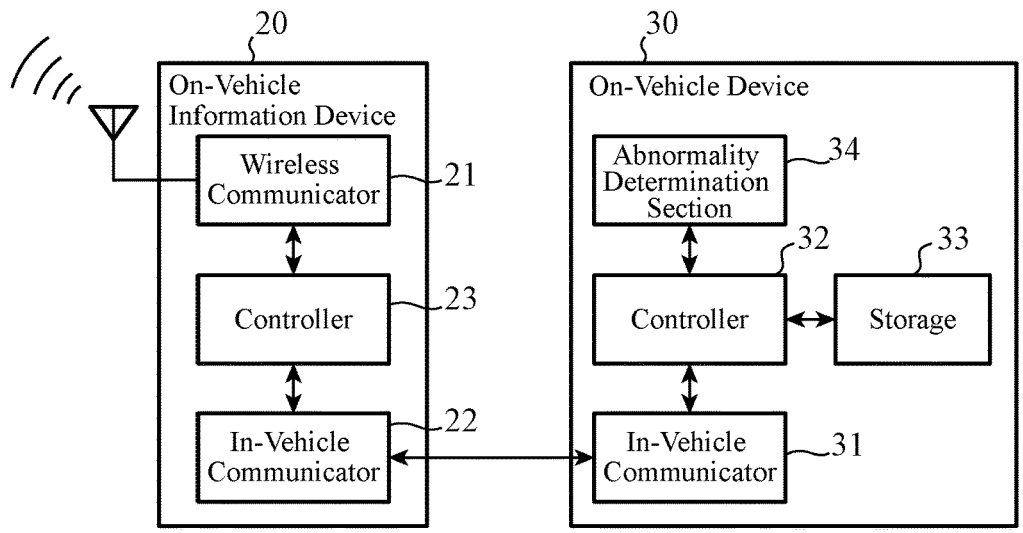
FIG. 3 is a block diagram illustrating structural examples of an on-vehicle information device and an on-vehicle device installed in a vehicle.

FIG. 3 is a block diagram illustrating structural examples of an on-vehicle information device 20 and an on-vehicle device 30.

The on-vehicle information device 20 includes a wireless communicator 21 to perform communication with the server I, an in-vehicle communicator 22 to perform communication with the on-vehicle devices 30, and a controller 23 to perform processes such as a process of updating the control information of an on-vehicle device 30 by using control information received from the server 1.

The on-vehicle device 30 includes an in-vehicle communicator 31 to perform communication with the on-vehicle information device 20, a storage 33 to store control information received from the on-vehicle information device 20, or the like, a controller 32 to perform update of the control information of the corresponding on-vehicle device 30 in accordance with a process request from the on-vehicle information device 20, or the like, and an abnormality determination section 34 to test the functions of the corresponding on-vehicle device 30 after the update and detect the presence or absence of abnormality.

The on-vehicle device 30 may be an electric power steering (EPS), an antilock brake system (ABS), an electronic brake force distribution (EBD), or a navigation system, for example.

Note that, in the embodiments of the present invention, the on-vehicle information device 20 functions as a gateway provided between the server 1 and the on-vehicle devices 30.

Next, example hardware structures of the server 1, the on-vehicle information device 20, and the on-vehicle devices 30 will be described.

Figure 4:
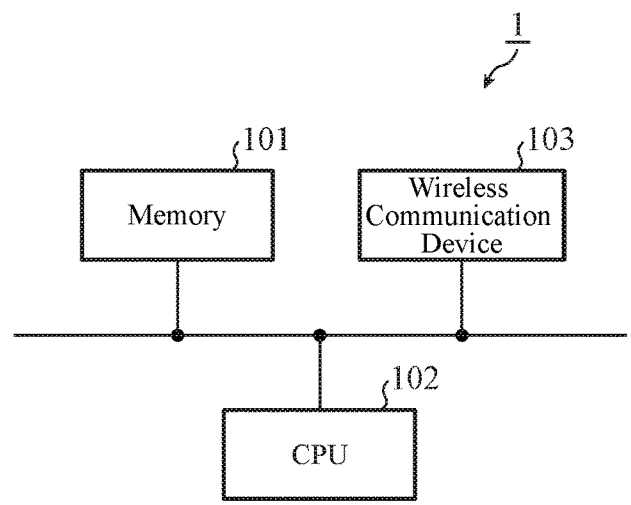
FIG. 4 is a hardware structure diagram of the server in the vehicular information communication system according to the Embodiment 1.

FIG. 4 is a diagram illustrating an example hardware structure of the server 1. The wireless communicator 4 of the server 1 corresponds to a wireless communication device 103 which performs wireless communication with the on-vehicle information device 20 installed in each vehicle 10. The storage 2 of the server 1 corresponds to a memory 101.

In addition, the controller 3 of the server I is implemented by processing circuitry. Specifically, the server I includes processing circuitry for dividing the vehicles 10 into groups and performing the transmission process of control information toward each of the groups in turn. The processing circuitry corresponds to a central processor (CPU) 102 for executing programs stored in the memory 101.

The functions of the controller 3 may be implemented by software, firmware, or combination of software and firmware. The software or firmware is described in the form of programs and stored in the memory 101. The CPU 102 implements the functions of the transmission group selector 5, the transmission/reception processor 6, the abnormality determination section 7, and the transmission suspending section 8 by reading out and executing the programs from the memory 101. In other words, the server I includes the memory 101 to store programs executed by the CPU 102, which results in execution of steps illustrated in FIG. 7, which will be described later. Note that these programs can also be deemed to cause a computer to execute the procedures or methods of the controller 3.

Note that the CPU 102, and CPUs 202 and 302, which will be described later, refer to central processors, processors, computing units, processors, microprocessors, digital signal processors (DSPs) or the like, for example.

The memory 101, and memories 201 and 301, which will be described later, may be non-volatile or volatile semiconductor memories, such as random access memories (RAMs), read only memories (ROMs), flash memories, erasable programmable ROMs (EEPROMs), or electrically EPROMs (EEPROMs), magnetic disks such as hard disks, or flexible disks, or optical disks such as mini discs, compact discs (CDs), or digital versatile discs (DVDs), for example.

Figure 5:
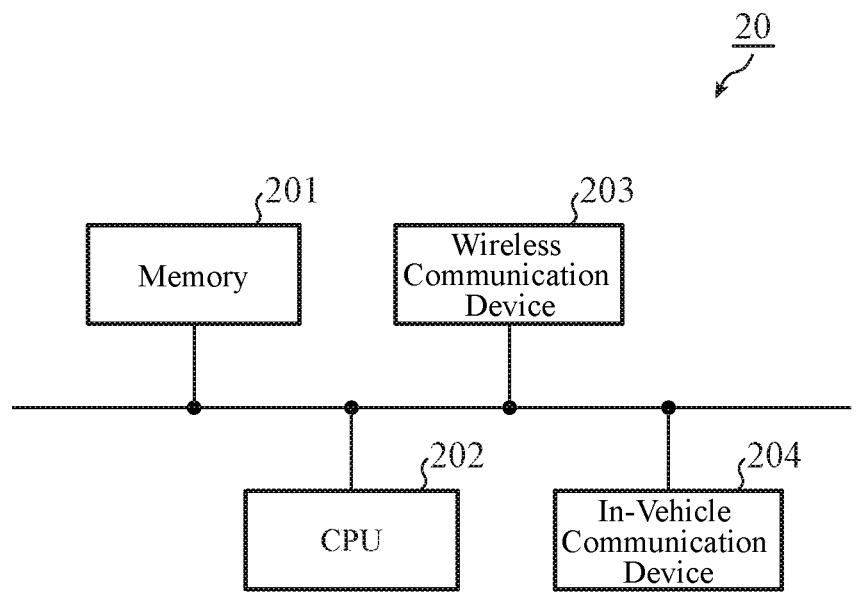
FIG. 5 is a hardware structure diagram of the on-vehicle information device in the vehicular information communication system according to the Embodiment 1.

FIG. 5 is a diagram illustrating an example hardware structure of the on-vehicle information device 20. The wireless communicator 21 of the on-vehicle information device 20 corresponds to a wireless communication device 203 for performing wireless communication with the server 1. The in-vehicle communicator 22 of the on-vehicle information device 20 corresponds to an in-vehicle communication device 204 for performing communication with the display device 11, the input device 12, and the on-vehicle devices 30.

The controller 23 of the on-vehicle information device 20 is implemented by processing circuitry. Specifically, the on-vehicle information device 20 includes processing circuitry for updating the control information of an on-vehicle device 30 by using control information received from the server 1, and transmitting, to the server 1, a response indicating the presence or absence of abnormality when the on-vehicle device 30 operates based on the updated control information. The processing circuitry corresponds to the CPU 202 for executing programs stored in the memory 201.

The functions of the controller 23 may be implemented by software, firmware, or combination of software and firmware. The software or firmware is described in the form of programs and stored in the memory 201. The CPU 202 implements the function of individual sections by reading out and executing the programs from in the memory 201. In other words, the on-vehicle information device 20 includes the memory 201 for storing programs executed by the CPU 202, which results in execution of steps illustrated in FIG. 8, which will be described later. Note that these programs can also be deemed to cause a computer to execute the procedures or methods of the controller 23.

Figure 6:
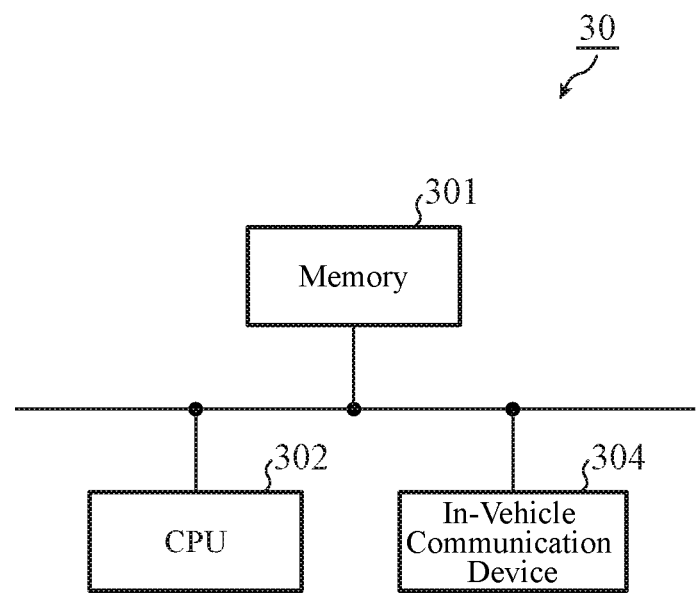
FIG. 6 is a hardware structure diagram of an on-vehicle device in the vehicular information communication system according to the Embodiment 1.

FIG. 6 is a diagram illustrating an example hardware structure of an on-vehicle device 30. The in-vehicle communicator 31 of the on-vehicle device 30 corresponds to an in-vehicle communication device 304 for performing communication with the on-vehicle information device 20. In the on-vehicle device 30, the storage 33 corresponds to the memory 301.

In addition, the controller 32 and the abnormality determination section 34 of the on-vehicle device 30 are implemented by processing circuitry. Specifically, the on-vehicle device 30 includes a processor to perform update of the control information of the on-vehicle device 30, or the like, in accordance with a process request from the on-vehicle information device 20, and detect the presence or absence of abnormality by testing the functions of the corresponding on-vehicle device 30 after performing the update. The processing circuitry corresponds to the CPU 302 for executing programs stored in the memory 301.

The functions of the controller 32 and the abnormality determination section 34 may be implemented by software, firmware, or combination of software and firmware. The software or firmware is described in the form of programs and stored in the memory 301. The CPU 302 implements the function of respective sections by reading out and executing, the programs from in the memory 301. In other words, the on-vehicle device 30 includes the memory 301 for storing programs executed by the CPU 302, which results in execution of steps illustrated in FIG. 9, which will be described later. Note that these programs can also be deemed to cause a computer to execute the procedures or methods of the controller 32 and the abnormality determination section 34.

Note that the control information of an on-vehicle device 30 is at least one of software, firmware, and combination of software and firmware as mentioned above, and parameters referred to in execution of software or the like.

While a structure, in which wireless communication is performed between the wireless communicator 4 of the server 1 and the wireless communicator 21 of the on-vehicle information device 20, is presented in the embodiments of the present invention, a structure in which wired communication is performed may be employed alternatively. For example, in a case where the vehicle 10 is an electric automobile, the server 1 and the on-vehicle information device 20 is capable of performing wired communication with each other during charging of the electric automobile. Thus, such a communication function may be used for updating the control information.

Next, example operation of the vehicular information communication system according to the Embodiment 1 will be described. Herein, the operations of the server 1, the on-vehicle information device 20, and the on-vehicle device 30 will be described on an assumption that the control information of the on-vehicle devices 30, which are installed in the first to 1000th vehicles 10, needs to be updated.

Figure 7:
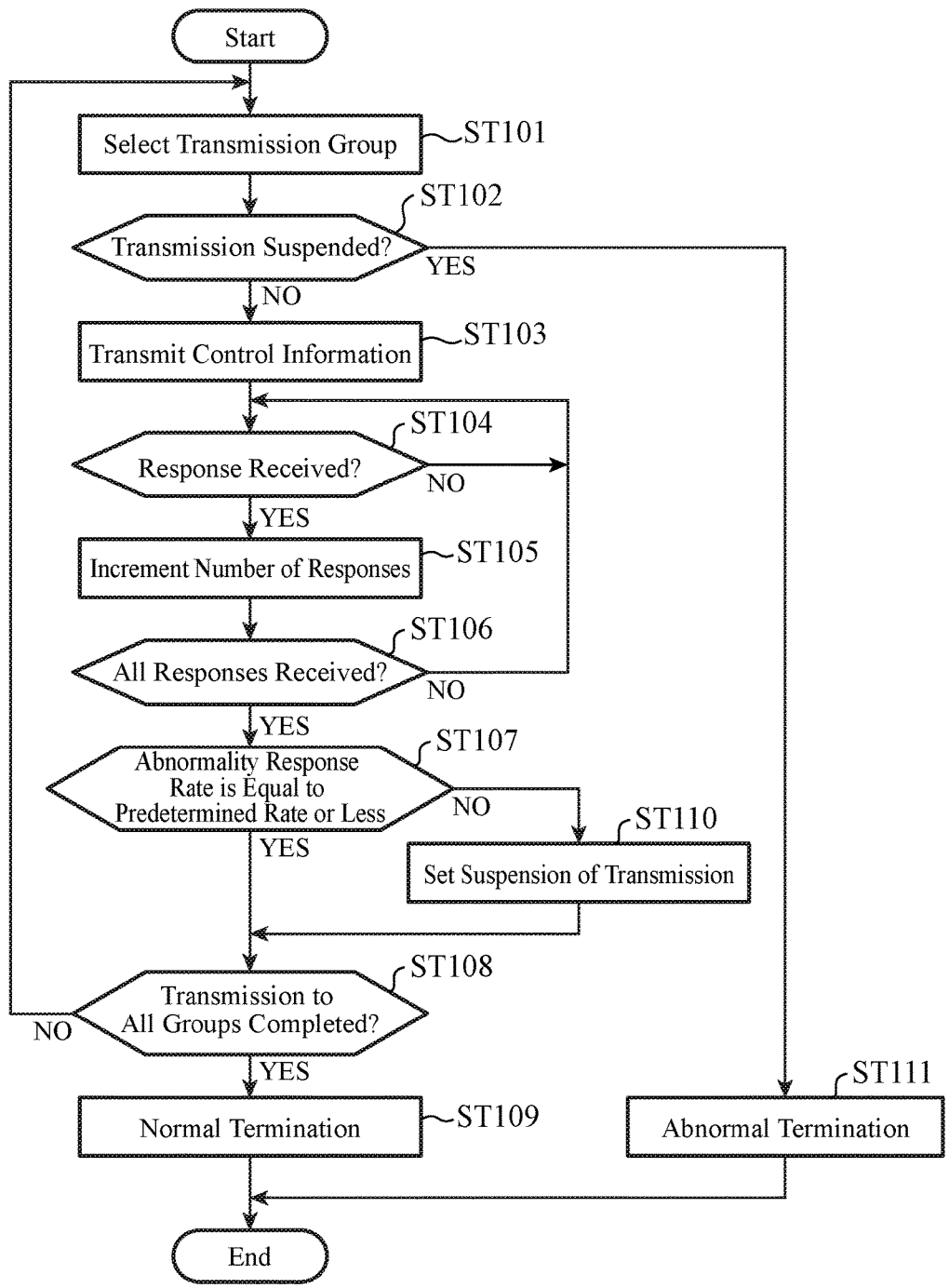
FIG. 7 is a flowchart illustrating operation of the server in the vehicular information communication system according to the Embodiment 1.

FIG. 7 is a flowchart illustrating example operation of the server 1 according to the Embodiment 1. When control information, on which update is needed, is prepared, it is registered in the storage 2 of the server 1. Vehicle information of vehicles to be updated is also registered together with the control information. The vehicle information herein indicates the first to 1000th vehicles 10. The transmission group selector 5 of the controller 3 divides the vehicles 10 into appropriate groups by using the vehicle information stored in the storage 2, and determines the order of transmission. Hereinafter, it is assumed that the transmission group selector 5 divides the first to 1000th vehicles into ten groups, each of which consists of one hundred vehicles 10, and determines to transmit the control information in ascending order of the group number.

In step ST101, the transmission group selector 5 selects the first group consisting of the first to 100th vehicles 10, and notifies the transmission/reception processor 6 of the selected group.

In step ST102, the transmission/reception processor 6 checks whether or not transmission of the control information is suspended by the transmission suspending section 8 due to some abnormality. When the transmission is not suspended (step ST102 "NO"), the transmission/reception processor 6 proceeds to a transmission process of step ST103 and subsequent steps. On the other hand, when the transmission is suspended (step ST102 "YES"), the transmission/reception processor 6 proceeds to step ST111.

In step ST103, the transmission/reception processor 6 transmits, through the wireless communicator 4, the control information stored in the storage 2 to the on-vehicle information device 20 of each vehicle 10 belonging to the transmission group selected in step ST101.

In step ST104, the transmission/reception processor 6 checks whether or not a response from the on-vehicle information device 20 of each vehicle 10, which belong to the transmission group selected in step ST101, is received through the wireless communicator 4. When the response is not received from the on-vehicle information device 20 (step ST104 "NO"), the transmission/reception processor 6 waits for a response from the on-vehicle information devices 20 in step ST104, and proceeds to step ST105 when a response is received from the on-vehicle information device 20 (step ST104 "YES").

In step ST105, the transmission/reception processor 6 notifies the abnormality determination section 7 of the reception of the response. Upon receiving this notification, the abnormality determination section 7 increments the number of responses from the on-vehicle information devices 20 belonging to the selected transmission group.

As described later in detail, the response from each on-vehicle information device 20 refers to either an abnormality response or a normality response. The abnormality response indicates that abnormality was detected when an on-vehicle device 30 operated on the basis of updated control information. The normality response indicates that abnormality was not detected.

In step ST106, the abnormality determination section 7 checks whether or not responses have been received from the on-vehicle information devices 20 of all the vehicles 10 belonging to the selected transmission group. When responses have been received from the on-vehicle information devices 20 of all the vehicles 10 belonging to the selected transmission group, that is, from the on-vehicle information devices 20 of the first to 100th vehicles 10, the abnormality determination section 7 proceeds to step ST107 (step ST106 "YES"). When there is a vehicle 10 which has not yet responded (step ST106 "NO"), the abnormality determination section 7 returns to step ST104 and waits for the response.

In step ST107, the abnormality determination section 7 calculates a ratio of the number of abnormality responses to the total number of responses, that is, calculates an abnormality response rate (=the number of abnormality responses/the total number of responses) as to the selected transmission group, and compares the abnormality response rate with a predetermined reference value. The predetermined reference value may refer to a predetermined rate (1%, for example) used for distinguishing between a potential abnormality occurring in common among the on-vehicle device 30 of each vehicle 10 due to update of the control information and an abnormality peculiar to an on-vehicle device 30 of a vehicle 10.

When the abnormality response rate of the selected transmission group is equal to the predetermined rate or less (step ST107 "YES"), the abnormality determination section 7 determines that abnormality having occurred is not caused by the control information but is an abnormality peculiar to an on-vehicle device 30, and proceeds to step ST108 to continue transmission of the control information. On the other hand, when the abnormality response rate of the selected transmission group is larger than the predetermined rate (step ST107 "NO"), the abnormality determination section 7 determines that abnormality having occurred is not the abnormality peculiar to an on-vehicle device 30 of a vehicle 10 but is a potential abnormality caused by the control information, which can occur in common among the on-vehicle device 30 of each vehicle 10, and proceeds to step ST110.

In step ST110, the abnormality determination section 7 notifies the transmission suspending section 8 of the occurrence of abnormality. Upon receiving the notification, the transmission suspending section 8 sets suspension of transmission, and proceeds to step ST108.

As explained above, at step ST106 in the Embodiment 1, the abnormality determination section 7 checks whether or not responses have been received from the on-vehicle information devices 20 of all the vehicles 10 belonging to the selected transmission group. Alternatively, the abnormality determination section 7 may be configured to check whether or not responses have been received from a predetermined number or more of the on-vehicle information devices 20 of all the vehicles 10 belonging to the selected transmission group. For example, the abnormality determination section 7 may check whether or not responses from 95% or more of the on-vehicle information devices 20 in the transmission group have been received. Alternatively, the ratio of the number of abnormality responses may be calculated and compared with a predetermined ratio when a predetermined time, which is sufficient to perform abnormality determination, has elapsed after completing the transmission of control information.

In step ST108, the transmission group selector 5 checks whether or not the control information has been transmitted to all transmission groups. When the transmission toward all the transmission groups have been completed (step ST108 "YES"), the transmission group selector 5 proceeds to step ST109 to determine that it is normally terminated and terminates the series of procedures. In this case, the controller 3 may store the normal termination as a log in the storage 2. When the transmission to all the transmission groups has not been completed (step ST108 "NO"), the transmission group selector 5 returns to step ST101 and selects a transmission group having a following turn.

In step ST111, the suspension of transmission has been set as a result of transmission for the previous transmission group. Therefore, the transmission/reception processor 6 does not perform transmission of control information to the transmission group selected in step ST101 and subsequent groups. The transmission/reception processor 6 determines that it is abnormality termination, and terminates the series of procedures. In this case, the controller 3 may store the abnormal termination as a log in the storage 2.

In this manner, if assuming that the abnormality response rate of the responses from each on-vehicle information device 20 of the first to 100th vehicles 10 belonging to the initial transmission group is equal to or less than the predetermined rate, transmission to the control information for each on-vehicle information device 20 of the 101st to the 1000th vehicles 10 is suspended. Therefore, abnormality of on-vehicle devices 30 due to update of the control information is prevented from spreading.

A case where the transmission is resumed from suspension will be described later in Embodiment 2.

Figure 8:
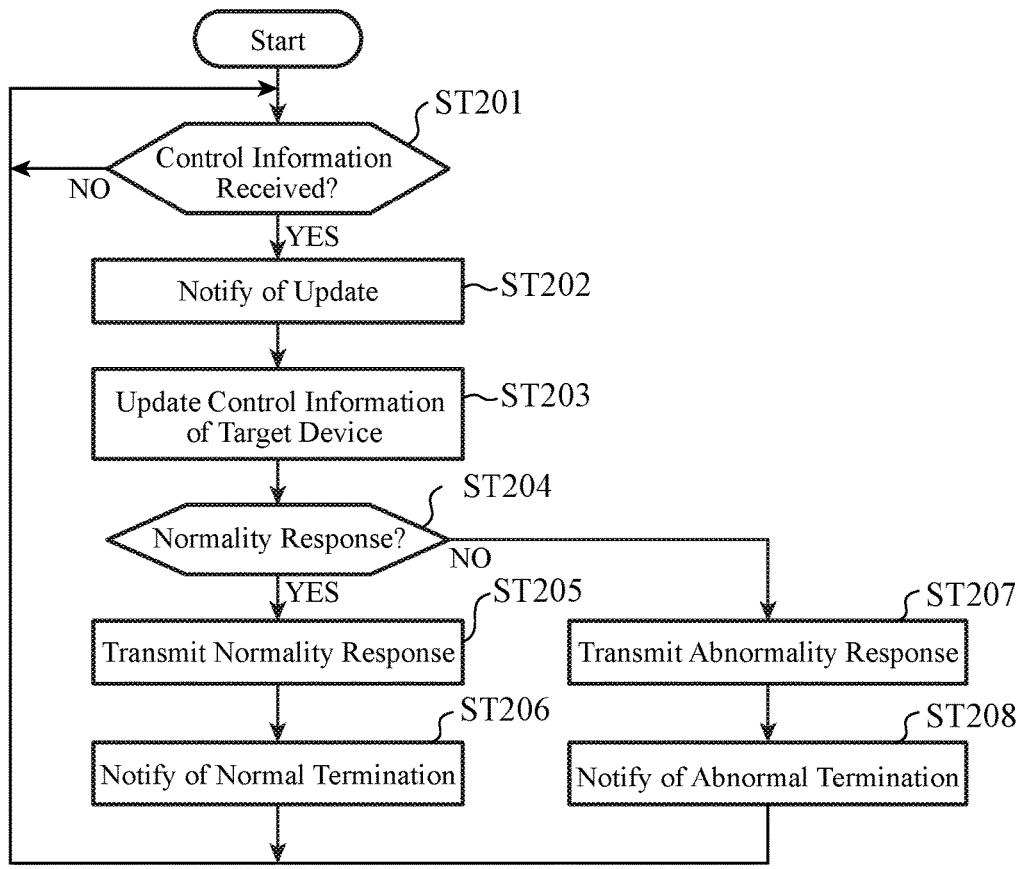
FIG. 8 is a flowchart illustrating operation of the on-vehicle information device in the vehicular information communication system according to the Embodiment 1.

FIG. 8 is a flowchart illustrating example operation of an on-vehicle information device 20 in the Embodiment 1. When an ignition switch of a vehicle 10 is turned on and power supply to the respective units of the vehicle 10 is started, the on-vehicle information device 20 repeats the process illustrated in FIG. 8. The process illustrated in FIG. 8 is performed in common by each on-vehicle information device 20 installed in the first to 1000th vehicles 10.

In step ST201, the controller 23 checks whether or not control information from the server 1 is received through the wireless communicator 21. The controller 23 waits for the transmission from the server 1 in step ST201 when the control information from the server 1 is not received (step ST201 "NO"), and proceeds to step ST202 when the control information from the server 1 is received (step ST201 "YES").

In step ST202, the controller 23 transmits, to the display device 11 through the in-vehicle communicator 22, a notification indicating that an update process for the on-vehicle devices 30 is going to be performed by using the control information received from the server 1, and controls the display device 11 to display the notification.

In step ST203, the controller 23 transmits, to an on-vehicle device 30 through the in-vehicle communicator 22, the control information received from the server 1, and controls the on-vehicle device 30 to perform the update process and an operation check process.

After finishing the update process and the operation check process at the on-vehicle device 30, a normality response indicating that abnormality is not detected or an abnormality response indicating that abnormality is detected is transmitted from the on-vehicle device 30 to the on-vehicle information device 20.

In step ST204, the controller 23 receives the response from the on-vehicle device 30 through the in-vehicle communicator 22, and checks whether or not the received response is the normality response. When the normality response is received from the on-vehicle device 30 (step ST204 "YES"), the controller 23 proceeds to step ST205. When the abnormality response is received from the on-vehicle device 30 (step ST204 "NO"), the controller 23 proceeds to step ST207.

In step ST205, the controller 23 transmits, to the server 1 through the wireless communicator 21, a normality response indicating that abnormality due to the process of updating the control information did not occur in the on-vehicle device 30.

In step ST206, the controller 23 transmits, to the display device 11 through the in-vehicle communicator 22, a notification indicating that the process of updating the control information has been terminated normally, and controls the display device 11 to display the notification.

In step ST207, the controller 23 transmits, to the server 1 through the wireless communicator 21, an abnormality response indicating that abnormality due to the process of updating the control information occurred in the on-vehicle device 30.

In step ST208, the controller 23 transmits, to the display device 11 through the in-vehicle communicator 22, a notification indicating that the process of updating the control information has been terminated abnormally, and controls the display device 11 to display the notification. This display is capable of alerting the user to the occurrence of abnormality in the on-vehicle device 30.

In the flowchart of FIG. 8, the on-vehicle information device 20 is configured to provide notifications to the user in steps ST202, ST206, and ST208. Alternatively, it may be configured not to provide notifications to the user.

Figures 9, 10:
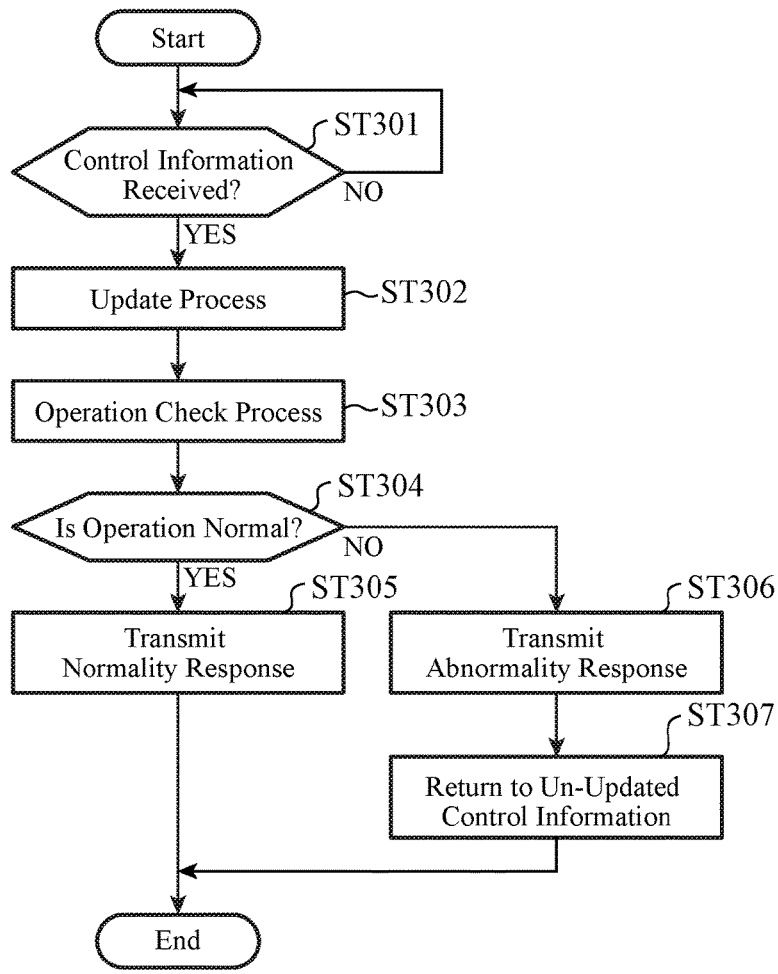
FIG. 9 is a flowchart illustrating operation of an on-vehicle device in the vehicular information communication system according to the Embodiment 1.
FIG. 10 is a table representing an example of seriousness information that a server in a vehicular information communication system according to Embodiment 2 of the present invention has.

FIG. 9 is a flowchart illustrating example operation of an on-vehicle device 30 in the Embodiment 1. When an ignition switch of a vehicle 10 is turned on and power supply to the respective units of the vehicle 10 is started, an on-vehicle device 30 repeats the process illustrated in FIG. 9. The process illustrated in FIG. 9 is performed in common by each on-vehicle device 30 installed in the first to 1000th vehicles 10.

In step ST301, the controller 32 checks whether or not control information from the on-vehicle information device 20 is received through the in-vehicle communicator 31. When the control information is not received from the on-vehicle information device 20 (step ST301 "NO"), the controller 32 waits for transmission from the on-vehicle information device 20 in step ST301. When the control information is received from the on-vehicle information device 20 (step ST301 "YES"), the controller 32 proceeds to step ST302.

In step ST302, the controller 32 performs the update process by using the control information received from the on-vehicle information device 20. Note that the controller 32 may store current control information in the storage 33 before performing the update process with the control information received from the on-vehicle information device 20.

In step ST303, as a process of operation check of the on-vehicle device 30 after finishing the update process, the abnormality determination section 34 detects the presence or absence of abnormality in a condition where the on-vehicle device 30 operates based on the updated control information. For example, the abnormality determination section 34 detects, as performing the operation check process, the presence or absence of abnormality by entering a self-diagnostic mode and performing operation check of various sensors and applications included in the on-vehicle device 30.

In step ST304, the controller 32 checks whether or not abnormality is detected by the abnormality determination section 34. When the on-vehicle device 30 operated normally and the abnormality is not detected (step ST304 "YES"), the controller 32 proceeds to step ST305. When the on-vehicle device 30 did not operate normally and the abnormality is detected (step ST304 "NO"), the controller 32 proceeds to step ST306.

In step ST305, the controller 32 transmits, to the on-vehicle information device 20 through the in-vehicle communicator 31, a normality response indicating that the abnormality is not detected.

In step ST306, the controller 32 transmits, to the on-vehicle information device 20 through the in-vehicle communicator 31, an abnormality response indicating that abnormality is detected.

In step ST307, when un-updated control information has been stored in the storage 33, the controller 32 returns the control information causing the abnormality to the un-updated control information.

As described above, according to the Embodiment 1, the on-vehicle information device 20 is configured to receive control information from the server 1 and update control information of an on-vehicle device 30, and transmit a response to the server 1 based on the updated control information, the response indicating presence or absence of abnormality in a condition where the on-vehicle device 30 operates. When dividing the vehicles 10 into groups and performing a transmission process of control information in turn toward each group, the server 1 is configured to transmit the control information to the on-vehicle information device 20 of each vehicle 10 belonging to a group to which a processing turn of the transmission process has come, receive responses indicating presence or absence of abnormality, when responses indicating presence of abnormality are a predetermined reference value or less, perform a transmission process of control information toward a group having a following turn, and when the responses indicating presence of abnormality are more than the predetermined reference value, suspend transmission processes of control information toward groups having following and subsequent turns. Therefore, it is capable of preventing the abnormality due to update of the control information from spreading. In addition, the responses indicating the presence or absence of abnormality are assembled in the server 1. This enables the server 1 to grasp the number of vehicles 10 in which on-vehicle devices 30 with abnormality are installed and the number of vehicles 10 in which on-vehicle devices 30 without abnormality are installed, and also enables the server 1 to distinguish between a potential abnormality caused in common among vehicles due to update of control information and an abnormality peculiar to a vehicle. Therefore, it is capable of suspending transmission of the control information, which causes a potential abnormality in common among vehicles due to update of control information.

Furthermore, according to the Embodiment 1 when abnormality is caused on an on-vehicle device 30 due to update of control information, the on-vehicle information device 20 provides notification to the user. This allows the user to be alerted to the occurrence of abnormality in update of the on-vehicle device 30 performed by remote operation of the server 1.

(Embodiment 2)

The structure of a vehicular information communication system according to Embodiment 2 of the present invention is similar in depiction to that of the vehicular information communication system of the Embodiment 1 illustrated in FIG. 1. Therefore, FIGS. 1 to 6 will be referred to below.

In the Embodiment 2, the storage 2 of the server 1 stores seriousness information indicating an upper limit on the number of abnormality responses. The upper limit is set depending on seriousness of influence on a vehicle 10 in a situation where abnormality occurs due to update of control information in an on-vehicle device 30 installed in the vehicle 10.

FIG. 10 illustrates an example of the seriousness information. Control information used for on-vehicle devices 30, such as an EPS, an ABS, and an EBD, is control information as vehicle control information that is important for safe driving of vehicles 10. If abnormality occurs in an on-vehicle device 30 due to such control information, the influence on a vehicle 10 of the on-vehicle device 30 may be severe. Therefore, higher seriousness and a smaller upper limit ("1", for example) are set for those control information. In contrast, control information used for on-vehicle devices 30, such as navigation devices, is considered not important for safe driving of vehicles 10. If abnormality occurs in an on-vehicle device 30 due to such control information, the influence on a vehicle 10 of the on-vehicle device 30 may be not so severe. Therefore, lower seriousness and a larger upper limit ("10", for example) are set for those control information.

Next, example operation of the vehicular information communication system according to the Embodiment 2 will be described. The operations of the server 1 and the on-vehicle information device 20 will be described on the assumption that, similarly to the foregoing Embodiment 1, the control information of each on-vehicle device 30 installed in the first to 1000th vehicles 10 needs to be updated. Since the operation of on-vehicle devices 30 is the same between the Embodiments 1 and 2, the description thereof is not repeated.

Figure 11:
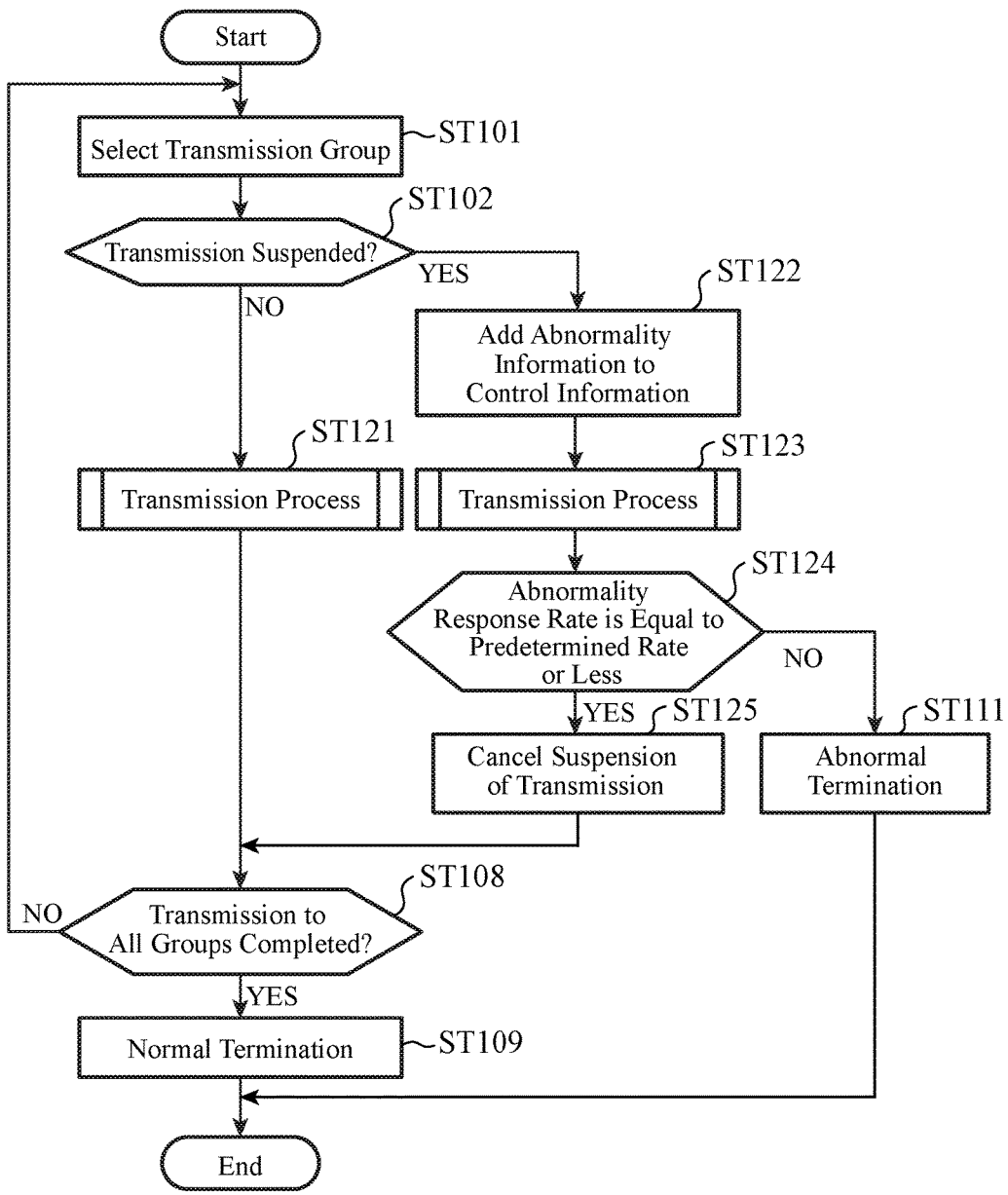
FIG. 11 is a flowchart illustrating operation of the server in the vehicular information communication system according to the Embodiment 2.

FIG. 11 is a flowchart illustrating example operation of the server 1 according to the Embodiment 2.

In steps ST101 and ST102, the controller 3 performs the same processing as that in steps ST101 and ST102 in FIG. 7. Subsequently, when the transmission has not been suspended as a result of the transmission toward the previous transmission group (step ST102 "NO"), the transmission/reception processor 6 of the controller 3 proceeds to step ST121. When the transmission has been suspended (step ST102 "YES"), the transmission/reception processor 6 proceeds to step ST122.

In step ST121, the transmission/reception processor 6 performs the transmission process of the control information to the on-vehicle information devices 20 of each vehicle 10 belonging to the transmission group selected in step ST101, and receives responses therefrom.

Details of the transmission process in step ST121 will be described later.

In step ST122, on the basis of the responses of the previous transmission group, the transmission/reception processor 6 generates abnormality information indicating the presence of abnormality in control information, and adds the generated abnormality information to this control information.

In step ST123, the transmission/reception processor 6 performs a transmission process of the control information, to which the abnormality information is added, to each on-vehicle information device 20 belonging to the transmission group selected in step ST101, and receives responses therefrom.

Details of the transmission process in step ST123 will be described later.

In step ST124, the abnormality determination section 7 compares the abnormality response rate of the selected transmission group with a predetermined rate. When the abnormality response rate of the selected transmission group is equal to or less than the predetermined rate (step ST124 "YES"), the abnormality determination section 7 proceeds to step ST125. When the abnormality response rate of the selected transmission group is larger than the predetermined rate (step ST124 "NO"), this means that the transmission toward two groups have been suspended successively. In this case, the abnormality determination section 7 proceeds to step ST111 to determine that abnormal termination occurs, and terminates the series of procedures.

In step ST125, the abnormality determination section 7 notifies the transmission suspending section 8 of the absence of abnormality. Upon receiving this notification, the transmission suspending section 8 cancels the suspension of transmission which has been set as a result of the transmission to the previous transmission group, and proceeds to step ST108.

In steps ST108, ST109, and ST111, the controller 3 performs the same processing as that in steps ST108, ST109, and ST111 in FIG. 7.

Figure 12:
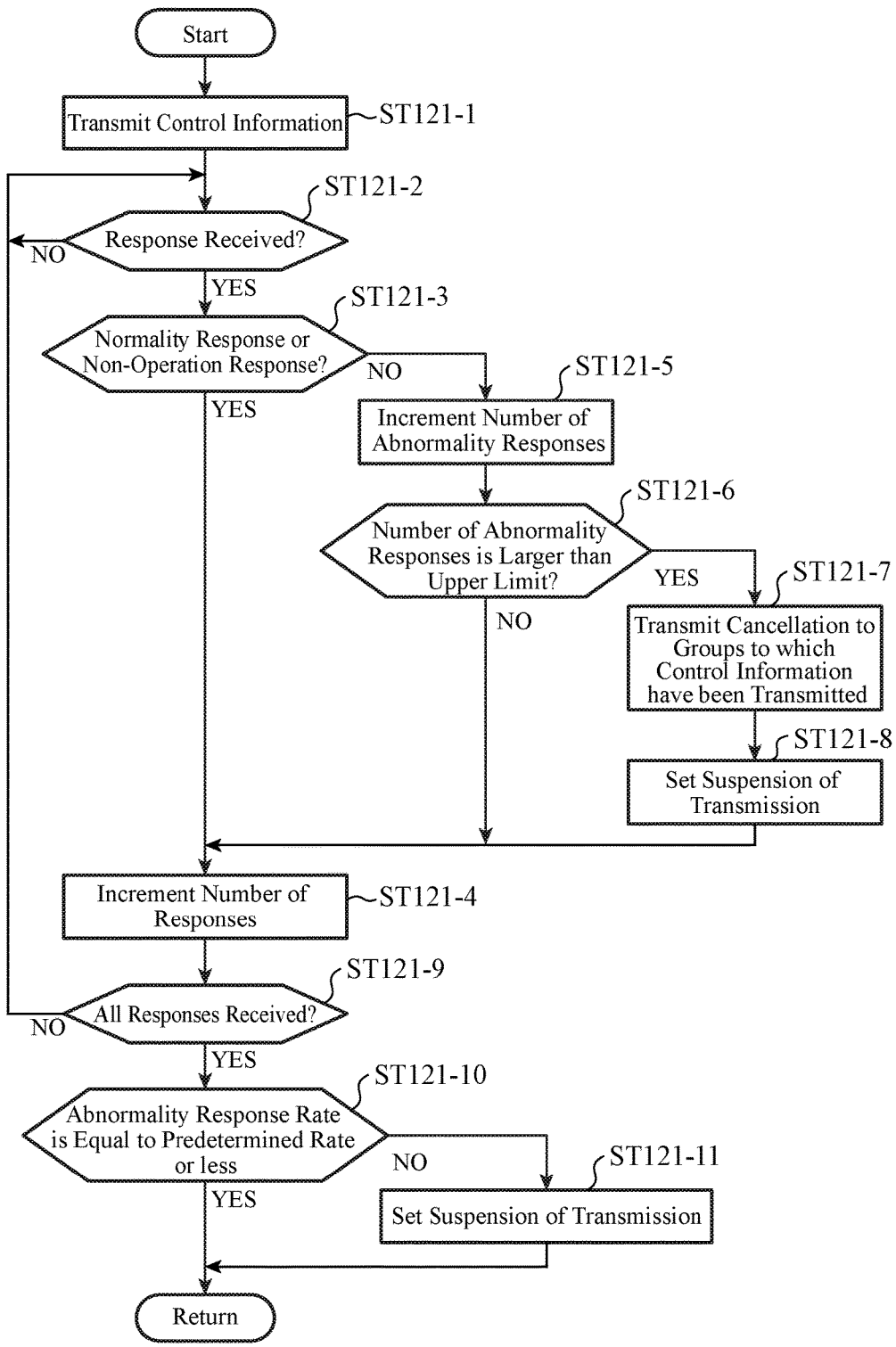
FIG. 12 is a flowchart illustrating details of steps ST121 and ST123 in FIG. 11.

FIG. 12 is a flowchart illustrating example operation of the transmission process of the server 1 in the Embodiment 2, and illustrates details of the transmission processes in steps ST121 and ST123 in FIG. 11.

In step ST121-1, the transmission/reception processor 6 transmits the control information or the control information including the abnormality information to the on-vehicle information devices 20 of each vehicle 10 belonging to the selected transmission group through the wireless communicator 4.

In step ST121-2, the transmission/reception processor 6 checks whether or not a response is received through the wireless communicator 4 from each on-vehicle information devices 20 of the vehicles 10 belonging to the selected transmission group. When the response is not received from the on-vehicle information devices 20 (step ST121-2 "NO"), the transmission/reception processor 6 waits for a response from each on-vehicle information device 20 in step ST121-2.

When a response is received from any of the on-vehicle information devices 20 (step ST121-2 "YES"), the transmission/reception processor 6 proceeds to step ST121-3.

In step ST121-3, the transmission/reception processor 6 checks whether or not the response from the on-vehicle information device 20 is either of a normality response or a non-operation response. When the response is a normality response or a non-operation response (step ST121-3 "YES"), the transmission/reception processor 6 proceeds to step ST121-4. When the response is not a normality response or a non-operation response, but is an abnormality response (step ST121-3 "NO"), the transmission/reception processor 6 proceeds to step ST121-5.

In step ST121-4, the transmission/reception processor 6 notifies the abnormality determination section 7 of the reception of a response. Upon receiving this notification, the abnormality determination section 7 increments the number of responses from the selected transmission group.

In a case where, for example, control information to be updated is used in an EPS, the operation check after update of the control information and the detection of the presence or absence of abnormality cannot be performed until the EPS of the vehicle 10 actually operates. Thus, the response regarding the control information takes time before the server 1 receives it from the on-vehicle information device 20.

Taking such inconvenience into consideration, the Embodiment 2 is made such that, if the on-vehicle device 30 has not performed the update process or the operation check process until a predetermined time (one hour, for example) has elapsed from the time when the on-vehicle information device 20 received the control information, the on-vehicle information device 20 transmits a non-operation response to the server 1. Details thereof will be described later.

In step ST121-5, the transmission/reception processor 6 notifies the abnormality determination section 7 that the response is an abnormality response. Upon receiving this notification, the abnormality determination section 7 increments the number of abnormality responses from the selected transmission group.

In step ST121-6, the abnormality determination section 7 compares the number of abnormality responses from the selected transmission group with the upper limit of the number of abnormality responses, which is set in the seriousness information depicted in FIG. 10. When the number of abnormality responses from the selected transmission group is smaller than the upper limit set in the seriousness information (step ST121-6 "NO"), the abnormality determination section 7 proceeds to step ST121-4. When the number of abnormality responses from the selected transmission group is equal to or larger than the upper limit set in the seriousness information (step ST121-6 "YES"), the abnormality determination section 7 proceeds to step ST121-7.

Specifically, in step ST121-6, the abnormality determination section 7 proceeds to step ST121-7 either when the number of abnormalities, which are caused by control information being vehicle control information with high seriousness, is equal or larger than the upper limit "1" or when the number of abnormalities caused by control information with low seriousness is not smaller than the upper limit "10".

In step ST121-7, the abnormality determination section 7 notifies the transmission/reception processor 6 of the occurrence of abnormality. Upon receiving this notification, the transmission/reception processor 6 transmits through the wireless communicator 4 a cancellation signal instructing to cancel update of the control information to the on-vehicle information device 20 of each vehicle 10 belonging to the selected transmission group and also groups for which the transmission of the control information has been finished. For example, assuming that the selected transmission group consists of the 301st to 400th vehicles 10, the transmission/reception processor 6 transmits the cancellation signal to each on-vehicle information device 20 in the 1st to 400th vehicles 10.

Note that, while no arrow is depicted from the abnormality determination section 7 to the transmission/reception processor 6 in FIG. 1B illustrating the structure of the controller 3 in the Embodiment 1, the controller 3 of the Embodiment 2 is assumed to have an arrow between them, which indicates an instruction from the abnormality determination section 7 to the transmission/reception processor 6 to transmit the cancellation signal.

In step ST121-8, the abnormality determination section 7 notifies the transmission suspending section 8 of the occurrence of abnormality. Upon receiving the notification, the transmission suspending section 8 sets suspension of transmission, and proceeds to step ST121-4. In step ST121-4, the abnormality determination section 7 increments the number of response.

In step ST121-9, the abnormality determination section 7 checks whether or not responses have been received from each on-vehicle information device 20 of all the vehicles 10 belonging to the selected transmission group. When responses have been received from each on-vehicle information device 20 of all the vehicles 10 belonging to the selected transmission group (step ST121-9 "YES"), the abnormality determination section 7 proceeds to step ST121-10. Otherwise (step ST121-9 "NO"), the abnormality determination section 7 returns to step ST121-2 and waits for a response from an on-vehicle information device 20.

In step ST121-10, the abnormality determination section 7 compares the abnormality response rate of the selected transmission group with a predetermined rate. The predetermined rate has the same value as the rate used in step ST124 in FIG. 11. When the abnormality response rate of the selected transmission group is equal to or less than the predetermined rate (step ST121-10 "YES"), this means that step ST121 or step ST123 in FIG. 11 is finished. Accordingly, the abnormality determination section 7 proceeds to a subsequent step to step ST121 or step ST123. When the abnormality response rate of the selected transmission group is larger than the predetermined rate (step ST121-10 "NO"), the abnormality determination section 7 proceeds to step ST121-11.

In step ST121-11, the abnormality determination section 7 notifies the transmission suspending section 8 of the occurrence of abnormality. Upon receiving the notification, the transmission suspending section 8 sets suspension of transmission, and proceeds to a subsequent step to step ST121 or step ST123.

For example, when the server 1 transmits control information being vehicle control information to on-vehicle devices 30 such as EPSs or ABSs or EBDs, the control information indicates seriousness of "high" and an upper limit of "1". Therefore, even if abnormality has occurred in only a single on-vehicle device 30 among the vehicles 10 belonging to the selected transmission group, a cancellation signal is transmitted to the on-vehicle information devices 20 of each vehicles 10 belonging to the groups to which transmission has been completed in order to cancel the update process, and suspension of the transmission is set. It is capable of suspending the transmission even if the abnormality response rate is less than the predetermined rate. Therefore, even in a situation where the transmission should be suspended continues over a following group, severe abnormality is prevented from spreading.

On the other hand, when the server 1 transmits control information other than the vehicle control information to on-vehicle devices 30 such as navigation devices, the control information indicate seriousness of "low" and an upper limit of "10". Therefore, when abnormality has occurred in only a single on-vehicle device 30 among the vehicles 10 belonging to the selected transmission group, the cancellation of the update process and the suspension of transmission are not performed. Criteria for determining whether or not to transmit control information can be changed depending on the seriousness of the influence of the control information on the vehicles 10.

Figure 13:
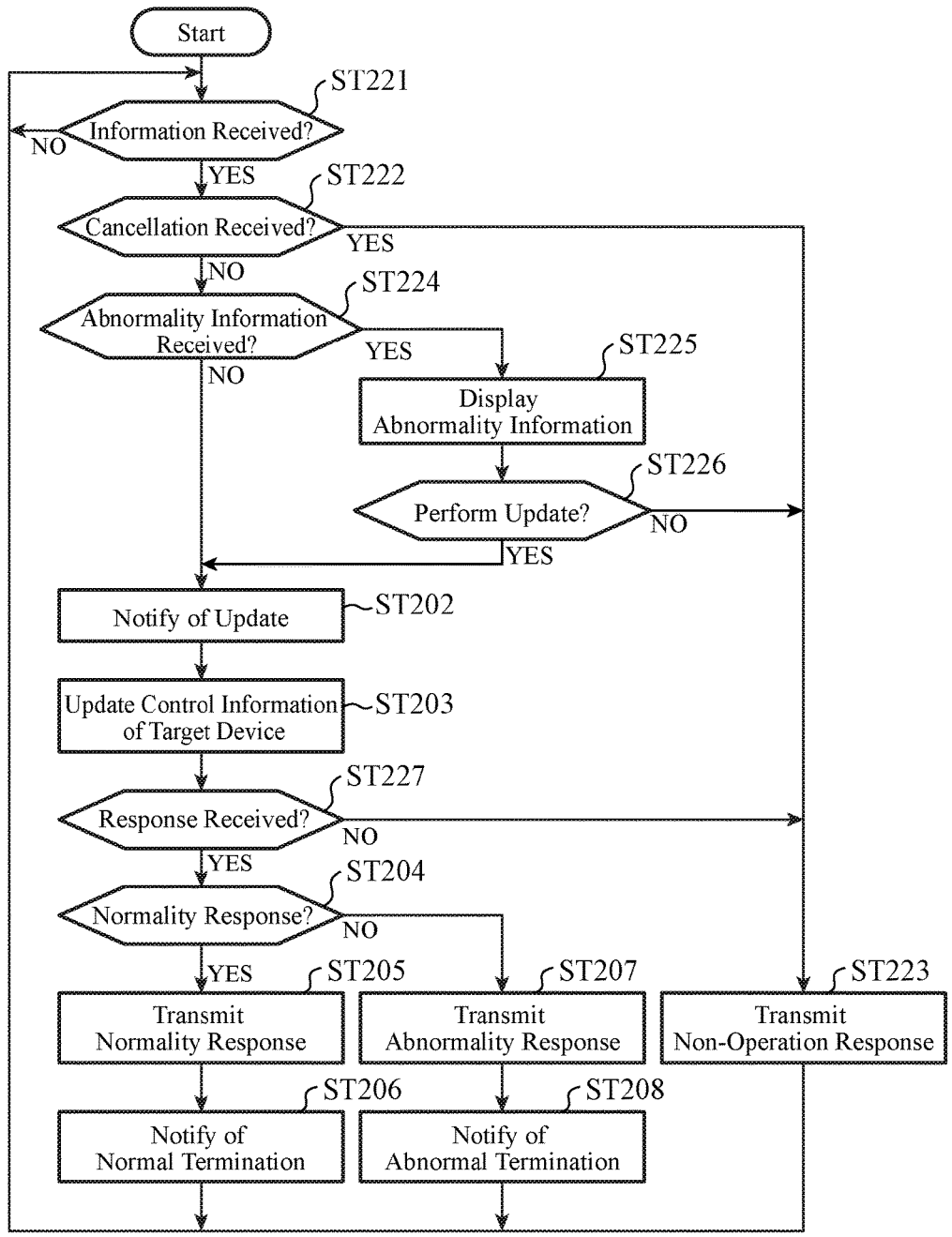
FIG. 13 is a flowchart illustrating, operation of an on-vehicle information device in the vehicular information communication system according to the Embodiment 2.

FIG. 13 is a flowchart illustrating example operation of an on-vehicle information device 20 in the Embodiment 2.

In step ST221, the controller 23 checks whether or not information transmitted from the server 1 is received through the wireless communicator 21. When the information from the server 1 is not received (step ST221 "NO"), the controller 23 waits for the transmission from the server 1 in step ST221. When the information from the server 1 is received (step ST221 "YES"), the controller 23 proceeds to step ST222.

The information received by the on-vehicle information device 20 from the server 1 in step ST221 is control information, control information to which abnormality information is added, or a cancellation signal.

In step ST222, the controller 23 checks whether or not the information received from the server 1 is a cancellation signal. The controller 23 proceeds to step ST223 when the cancellation signal is received (step ST222 "YES"), and proceeds to step ST224 when the cancellation signal is received (step ST222 "NO").

In step ST223, the controller 23 does not transmit to the on-vehicle devices 30 the control information received before receiving the cancellation signal, so that the update process of the on-vehicle device 30 is not performed. The controller 23 transmits, to the server 1 through the wireless communicator 21, a non-operation response indicating that the update process is not performed.

Note that, if the transmission of the control information to the on-vehicle devices 30 has been done when the cancellation signal is received from the server 1, the controller 23 may transmit to the on-vehicle devices 30 an instruction to cancel the update process. On receipt of this instruction, the on-vehicle device 30 discards the control information received from the on-vehicle information device 20. However, if the update process has already been performed, the on-vehicle device 30 may return the control information to the one before the update stored in the storage 33.

In step ST224, the controller 23 checks whether or not the information received from the server 1 is control information to which abnormality information is added. When control information, to which abnormality information is added, is received (step ST224 "YES"), the controller 23 proceeds to step ST225. When control information, to which abnormality information is added, is not received, that is, only control information is received (step ST224 "NO"), the controller 23 proceeds to step ST202.

In step ST225, the controller 23 transmits, to the display device 11 through the in-vehicle communicator 22, the abnormality information added to the control information and controls the display device 11 to display the content of the abnormality information. The controller 23 notifies the user of the content of the abnormality information, such as "Abnormality in XX occurred in one of fifty devices, but no significant influence is observed. Perform update?", in order to prompt the user to select whether or not to perform the update process in subsequent step ST226. The user inputs to the input device 12 an instruction on whether or not to update an on-vehicle device 30.

In step ST226, the controller 23 receives, from the input device 12 through the in-vehicle communicator 22, the instruction on whether or not to update the on-vehicle device 30 by using the control information to which abnormality information is added. The controller 23 proceeds to step ST202 when an instruction to perform the update is received (step ST226 "YES"), and proceeds to step ST223 when an instruction not to perform the update is received (step ST226 "NO").

In steps ST202 and ST203, the controller 23 performs the same processing as that in steps ST202 and ST203 in FIG. 8, and proceeds to step ST227.

In step ST227, the controller 23 checks whether or not a response from the on-vehicle device 30 is received through the in-vehicle communicator 22 within a predetermined time (one hour, for example) from the time when the controller 23 instructed the on-vehicle device 30 to update the control information in step ST203.

The controller 23 proceeds to step ST223 when the response is received within the predetermined time (step ST227 "NO"), and proceeds to step ST204 when the response is received within the predetermined time (step ST227 "YES").

In steps ST204 to ST208, the controller 23 performs the same processing as that in steps ST204 to ST208 in FIG. 8.

Note that, when transmitting to the display device 11 the notification in step ST208 of the Embodiment 2, which indicates that the process of updating the control information is abnormally terminated, to display the notification, the controller 23 may control the display device 11 to display a notification indicating the seriousness depending on whether the control information is vehicle control information or control information other than vehicle control information to be displayed. In this manner, when abnormality is caused in an on-vehicle device 30 by the update process using control information as vehicle control information, it is possible to alert the user to the possibility of severe influence of the abnormality on the vehicles 10.

As described above, according to the Embodiment 2, the server 1 performs, during suspension of the transmission process of control information to the groups having following and subsequent turns, a process of adding abnormality information indicating that abnormality occurred due to the control information and transmitting the control information including the abnormality information to the on-vehicle information devices 20 of each vehicles 10 belonging to some of the groups having following and subsequent turns. Further, when the abnormality response rate is equal to or less than the predetermined rate, the server 1 cancels the suspension and resumes the transmission process of the control information to the remaining groups. Therefore, it is capable of distinguishing between an abnormality peculiar to an on-vehicle device 30 installed in a vehicle 10 belonging to some group and a potential abnormality caused in common on each on-vehicle device 30 in vehicles 10 belonging to other groups. In addition, when the abnormality peculiar to some group is detected, it is possible for other groups to update the control information.

Furthermore, when abnormality occurs in a group on which the transmission process was earlier performed, it is possible to notify the remaining groups of the occurrence of the abnormality.

In addition, according to the Embodiment 2, upon receiving from the server 1 the control information including abnormality information, the on-vehicle information device 20 performs notification to the user and receives an instruction on whether or not to perform update using the control information including abnormality information, and upon receiving an instruction from the user to update, updates the control information of the on-vehicle device 30 with the control information including abnormality information. Therefore, it enables the user to perform update of the on-vehicle device 30 with understanding the possibility of occurrence of abnormality.

While the server 1 transmits control information to which the abnormality information is added in the Embodiment 2, the abnormality information may not be added. Specifically, the server 1 may be configured to perform, during suspension of the transmission process of control information toward groups having following and subsequent turns, a transmission process of the control information to the on-vehicle information device 20 of each vehicle 10 in part of the groups having following and subsequent turns, and cancel the suspension to resume the transmission process of the control information toward the remaining groups when the abnormality response rate is equal to or less than the predetermined rate. With this structure as well, it is possible to distinguish between an abnormality peculiar to an on-vehicle device 30 of a vehicle 10 belonging to some group and a potential abnormality occurring in common among the on-vehicle devices 30 of the vehicles 10 belonging to other groups. Furthermore, when the abnormality peculiar to some group is detected, it is possible for other groups to update the control information.

Furthermore, according to the Embodiment 2, the server 1 is configured to store seriousness information indicating an upper limit on number of responses indicating presence of abnormality, which are received in response to transmission of control information having a higher seriousness than other control information, the upper limit being set depending on seriousness of influence on a vehicle 30 in a situation where abnormality occurs due to update of control information in an on-vehicle device 30 of the vehicle 30, and suspend the transmission process of the control information toward the groups having following and subsequent turns when the number of responses indicating presence of abnormality received from the on-vehicle information devices 20 of the vehicles 30 belonging to a group, to which a processing turn of the transmission process has come, is equal to or more than the upper limit indicated by the seriousness information. Therefore, it is capable of suspending transmission of control information, which severely influences the vehicles 10, to prevent abnormality from spreading in a condition where the transmission should be suspended continues over a following group. Furthermore, the condition for determining whether or not to transmit control information can be changed depending on the seriousness of influence of the control information on the vehicles 10.

Furthermore, according to the Embodiment 2, when the number of responses indicating presence of abnormality received from the on-vehicle information device 20 of each vehicle 30 belonging to the group, to which a processing turn of the transmission process has come, is equal to or more than the upper limit indicated by the seriousness information, the server 1 transmits a cancellation signal, which instructs to cancel update, to the on-vehicle information device 20 of each vehicle 30 belonging to said group and belonging to groups for which the transmission processes of the control information have been finished. Therefore, it is capable to canceling the update of the control information, which severely influences the vehicles 10, to prevent the abnormality from spreading.

Furthermore, according to the Embodiment 2, when abnormality in the on-vehicle device is caused by update of the control information having a higher seriousness than other control information, the on-vehicle information device 20 performs notification to a user. It is capable of alert the user to possibility that the abnormality occurring in the on-vehicle device 30 may severely influence the vehicle 10.

In the Embodiment 2, when the number of abnormality responses from the on-vehicle information devices 20 of the vehicles 10 belonging to a group, to which a processing turn of the transmission process of control information has come, is equal to or larger than the upper limit indicated by the seriousness information (step ST121-6 "YES"), the server 1 sets suspension of transmission (step ST121-8), and, after that, cancels the suspension of transmission when the abnormality response rate is less than the predetermined rate (step ST125). However, the configuration of the server 1 is not limited to this case. For example, the server 1 may be configured to proceed to step ST111 and terminates abnormally when the number of abnormality responses is equal to or larger than the upper limit indicated by the seriousness information (step ST121-6 "YES"). This configuration is capable of prohibiting the transmission of control information which severely influences the vehicles 10 and more reliably preventing the abnormality from spreading.

In the Embodiments 1 and 2, the abnormality determination section 7 determines to suspend the transmission process of the control information toward groups having following and subsequent turns when the abnormality response rate of responses from the on-vehicle information devices 20 of the vehicles 10 belonging to the group whose turn to perform the transmission process of the control information has come is larger than the predetermined rate. However, the method for determining whether or not to suspend is not limited to this case.

For example, when the number of abnormality responses from the on-vehicle information devices 20 of the vehicles 10 belonging to the group whose turn to perform the transmission process of the control information has come is larger than the number of responses indicating non-abnormality, the abnormality determination section 7 may determine to suspend the transmission process of the control information toward the groups having following and subsequent turns. Note that the number of non-abnormality responses refers to the number of normality responses, or refers to the sum of the number of normality responses and the number of non-operation responses.

For another example, when the number of abnormality responses from the on-vehicle information devices 20 of the vehicles 10 belonging to the group whose turn to perform the transmission process of the control information has come is larger than a predetermined number, the abnormality determination section 7 may determine to suspend the transmission process of the control information toward the groups having following and subsequent turns.

As described above, the abnormality determination section 7 may determine to suspend the transmission process of the control information toward the groups having following and subsequent turns when abnormality responses from the on-vehicle information devices 20 of the vehicles 10 belonging to the group whose turn to perform the transmission process of the control information has come is more than a predetermined reference value. Either the number or the rate may be used for a criterion for the determination. Similarly, the abnormality determination section 7 may also use either of the number or the rate as a criterion for determining whether or not to cancel the suspension and resume the transmission in a condition where the transmission of control information is suspended.

In addition to the above, the embodiments of the present invention can be freely combined, any components in the embodiments can be modified, and any components in the embodiments can be omitted within the scope of the invention.

A vehicular information communication system according to the present invention is configured to suspend, when abnormality occurred in many on-vehicle devices belonging to a group to which control information had been transmitted, transmission of the control information to other groups. Therefore, the vehicular information communication system is suitable for the use of a vehicular information communication system in which a large number of on-vehicle devices are updated by remote operation performed by a server.

REFERENCE SIGNS LIST

1: Server, 2: Storage, 3: Controller, 4: Wireless communicator, 5: Transmission group selector, 6: Transmission/reception processor, 7: Abnormality determination section, 8: Transmission suspending section, 10: Vehicle, 11: Display device, 12: Input device, 20: On-vehicle information device, 21: Wireless communicator, 22: In-vehicle communicator, 23: Controller, 30A to 30C: On-vehicle device, 31: In-vehicle communicator, 32: Controller, 33: Storage, 34: Abnormality determination section, 101/201/301: Memory, 102/202/302: CPU, 103/203: Wireless communication device, 204/304: In-vehicle communication device

The invention claimed is:
1. A vehicular information communication system that performs communication between on-vehicle information devices of vehicles and a server, one of the on-vehicle information devices being installed in one of the vehicles,
wherein the on-vehicle information device is configured to
receive control information from the server and update control information of an on-vehicle device, and
transmit a response to the server based on the updated control information, the response indicating presence or absence of abnormality in a condition where the on-vehicle device operates,
wherein, when dividing the vehicles into groups and performing a transmission process of control information in turn toward each group, the server is configured to
transmit the control information to the on-vehicle information device of each vehicle belonging to a group to which a processing turn of the transmission process has come,
receive responses indicating presence or absence of abnormality,
when responses indicating presence of abnormality are a predetermined reference value or less, perform a transmission process of control information toward a group having a following turn, and
when the responses indicating presence of abnormality are more than the predetermined reference value, suspend transmission processes of control information toward groups having following and subsequent turns, and
wherein, during the suspension of the transmission process of control information toward the groups having following and subsequent turns, the server is further configured to
perform a transmission process of the control information to the on-vehicle information device of each vehicle belonging to part of the groups having following and subsequent turns, and
cancel the suspension and resume the transmission process of the control information toward remaining groups when responses indicating presence of abnormality is the predetermined reference value or less.

2. The vehicular information communication system according to claim 1, wherein the server is further configured to
store seriousness information indicating an upper limit on number of responses indicating presence of abnormality, which are received in response to transmission of control information having a higher seriousness than other control information, the upper limit being set depending on seriousness of influence on a vehicle in a situation where abnormality occurs due to update of control information in an on-vehicle device of the vehicle, and
suspend the transmission process of the control information toward the groups having following and subsequent turns when the number of responses indicating presence of abnormality received from the on-vehicle information devices of the vehicles belonging to a group, to which a processing turn of the transmission process has come, is equal to or more than the upper limit indicated by the seriousness information.

3. The vehicular information communication system according to claim 2, wherein, when the number of responses indicating presence of abnormality received from the on-vehicle information device of each vehicle belonging to the group, to which a processing turn of the transmission process has come, is equal to or more than the upper limit indicated by the seriousness information, the server is further configured to transmit a cancellation signal, which instructs to cancel update, to the on-vehicle information device of each vehicle belonging to said group and belonging to groups for which the transmission processes of the control information have been finished.

4. The vehicular information communication system according to claim 2, wherein, when abnormality in the on-vehicle device is caused by update of the control information having a higher seriousness than other control information, the on-vehicle information device is configured to perform notification to a user.

5. The vehicular information communication system according to claim 2, wherein, during the suspension of the transmission process of control information toward the groups having following and subsequent turns, the server is further configured to
perform a transmission process of control information, to which abnormality information indicating occurrence of abnormality has been included, to the on-vehicle information device of each vehicle belonging to part of the groups having following and subsequent turns, and
cancel the suspension and resume the transmission process of the control information toward remaining groups when responses indicating presence of abnormality is the predetermined reference value or less.

6. The vehicular information communication system according to claim 1,
wherein, during the suspension of the transmission process of control information toward the groups having following and subsequent turns, the server is further configured to perform a transmission process of control information, to which abnormality information indicating occurrence of abnormality has been added, to the on-vehicle information device of each vehicle belonging to part of the groups having following and subsequent turns, and wherein, upon receiving the control information including the abnormality information from the server, the on-vehicle information device is configured to perform notification to a user and receives an instruction on whether or not to perform update by using the control information including the abnormality information, and update the control information of the on-vehicle device with the control information including the abnormality information when an instruction to perform the update is received from the user.

7. A vehicular information communication method for performing communication between on-vehicle information devices of vehicles and a server, one of the on-vehicle information devices being installed in one of the vehicles, the method comprising:

transmitting, by the server when the vehicles are divided into groups and a transmission process of control information is performed in turn toward each group, the control information to the on-vehicle information device of each vehicle belonging to a group to which a processing turn of the transmission process has come;

receiving control information from the server and updating control information of an on-vehicle device and transmitting a response to the server based on the updated control information, the response indicating presence or absence of abnormality in a condition where the on-vehicle device operates, the receiving and the updating and the transmitting being performed by the on-vehicle information device of each vehicle belonging to the group to which the processing turn of the transmission process has come;

receiving, by the server, the responses indicating presence or absence of abnormality from the on-vehicle information device of each vehicle belonging to the group to which the processing turn of the transmission process has come;

performing, by the server, when responses indicating presence of abnormality are a predetermined reference value or less, a transmission process of control information toward a group having a following turn; and suspending, by the server, when the responses indicating presence of abnormality are more than the predetermined reference value, transmission processes of control information toward groups having following and subsequent turns, wherein, during the suspension of the transmission process of control information toward the groups having following and subsequent turns, the server is further configured to transmit the control information to the on-vehicle information device of each vehicle belonging to part of the groups having following and subsequent turns, and cancel the suspension and resume the transmission process of the control information toward remaining groups when responses indicating presence of abnormality is the predetermined reference value or less.

\* \* \* \* \*